US012288539B2

(12) United States Patent
Shishkov

(10) Patent No.: US 12,288,539 B2
(45) Date of Patent: Apr. 29, 2025

(54) STRINGED INSTRUMENT BRIDGE

(71) Applicant: Fender Musical Instruments Corporation, Scottsdale, AZ (US)

(72) Inventor: Yuriy Shishkov, Aliso Viejo, CA (US)

(73) Assignee: Fender Musical Instruments Corporation, Scottsdale, AZ (US)

( * ) Notice: Subject to any disclaimer, the term of this patent is extended or adjusted under 35 U.S.C. 154(b) by 491 days.

(21) Appl. No.: 17/737,519

(22) Filed: May 5, 2022

(65) Prior Publication Data

US 2022/0319472 A1 Oct. 6, 2022

Related U.S. Application Data

(60) Provisional application No. 63/200,902, filed on Apr. 2, 2021.

(51) Int. Cl.
*G10D 3/04* (2020.01)

(52) U.S. Cl.
CPC .................................... *G10D 3/04* (2013.01)

(58) Field of Classification Search
CPC ........ G10D 13/14; G10D 13/02; G10D 13/20; G10D 13/22
See application file for complete search history.

(56) References Cited

U.S. PATENT DOCUMENTS

| | | | |
|---|---|---|---|
| 4,457,201 A | 7/1984 | Storey | |
| 4,742,750 A | 5/1988 | Storey | |
| 5,227,571 A | 7/1993 | Cipriani | |
| 5,537,907 A | 7/1996 | Rose | |
| 6,870,083 B2 | 3/2005 | Turner | |
| 7,060,888 B2 | 6/2006 | Spalt | |
| 9,401,134 B2 | 7/2016 | Baker | |
| 9,905,212 B1 * | 2/2018 | McDonald ............ | G10D 1/085 |
| 10,586,517 B2 | 3/2020 | Dickinson | |
| 2005/0076767 A1 | 4/2005 | McCabe | |
| 2018/0012576 A1 * | 1/2018 | Colas .................... | G10D 1/085 |

* cited by examiner

*Primary Examiner* — Kimberly R Lockett
(74) *Attorney, Agent, or Firm* — Hall Estill Law Firm

(57) ABSTRACT

A stringed instrument can utilize a bridge assembly that allows for efficient and accurate adjustment of a saddle relative to an instrument body. The instrument body physically supports a bridge base beneath a plurality of strings with the bridge base constructed with a groove in which a tone plate and saddle are each positioned. The saddle may have an articulation mechanism positioned wholly outside of an areal extent of the plurality of strings while contacting the saddle. The articulation mechanism can contact the tone plate to support the saddle during movement of at least one of the plurality of strings.

20 Claims, 6 Drawing Sheets

STRINGED INSTRUMENT BRIDGE

RELATED APPLICATION

The present application makes a claim of domestic priority to U.S. Provisional Patent Application No. 63/200,902 filed Apr. 2, 2021, the contents of which are hereby incorporated by reference.

SUMMARY

A stringed instrument, in accordance with some embodiments, has an instrument body physically supporting a bridge base beneath a plurality of strings with the bridge base constructed with a groove in which a tone plate and saddle are each positioned. The saddle has an articulation mechanism positioned wholly outside of an areal extent of the plurality of strings while contacting the saddle. The articulation mechanism is arranged to contact the tone plate to support the saddle during movement of at least one of the plurality of strings.

Various embodiments of a stringed instrument bridge assembly consists of a bridge base attached to an instrument body beneath a plurality of strings with the bridge base having a groove aligned with the plurality of strings. A saddle is positioned within the groove of the base bridge to contact each of the plurality of strings. The saddle has a first articulation mechanism and a second articulation mechanism that are each positioned wholly external to an areal extent of the plurality of strings while a tone plate is positioned between the saddle and instrument body within the groove in the bridge base. The tone plate constructed of a rigid material that physically contacts each articulation mechanism.

In other embodiments, a tone plate is positioned within a groove of a bridge base that is attached to an instrument body prior to a saddle being positioned within the groove, atop the tone plate. The saddle is configured to contact and tension each of a plurality of strings to produce a predetermined sound upon selection of at least one of the plurality of strings. A height of the saddle relative to the instrument body is then adjusted with at least one articulation mechanism of the saddle. Each of the articulation mechanisms positioned wholly outside an areal extent of the plurality of strings to allow the height adjustment without moving the plurality of strings.

DETAILED DESCRIPTION

Embodiments of the present disclosure are directed to a stringed instrument bridge that allows for efficient and accurate saddle height adjustment while providing a low-profile bridge height.

A stringed instrument suspends at least one tensioned string over an electrical pickup and/or sound port that distributes sound electrically and/or acoustically. While the suspension of a string to generate musical sound can be facilitated in numerous, diverse manners, string intonation is controlled by contacting the string proximal to where the string will be plucked, or stroked. Such string contact can be configured to be a saddle, bridge, or both that aid in maintaining tension on the string, transferring string vibration, and space strings apart from one another.

It is contemplated that a saddle/bridge can be adjusted for height away from an instrument body to allow for manipulation of the action of the strings, vibration, and intonation. However, conventional adjustment of a bridge/saddle in a vertical direction can be bulky, imprecise, and/or inaccurate due to the configuration of the adjustment mechanisms. Thus, a continuing goal for stringed instrument construction is the improvement of the structure and function of a bridge/saddle that provides efficient vertical adjustment corresponding with accurate string action and vibration. Assorted embodiments of a bridge assembly are herein described to meet this industry and consumer goal.

Accordingly, some embodiments of a bridge position a tone plate in a groove of a bridge base between the bridge base and a saddle. The configuration of the saddle and groove allow the saddle to be vertically adjusted with mechanisms that do not add bulk or height to the overall bridge assembly. The positioning of the saddle adjustment mechanisms outside the areal extent of the strings allows the saddle to be adjusted efficiently and without loosening strings, dislocating the bridge, or moving an electronic pickup. As a result, the bridge can have a relatively low-profile height that provides stability and strength to optimize instrument tone, string vibration, and string intonation. It is noted that a bridge, in various embodiments, can be configured as a floating bridge or a fixed bridge.

Figure 1:
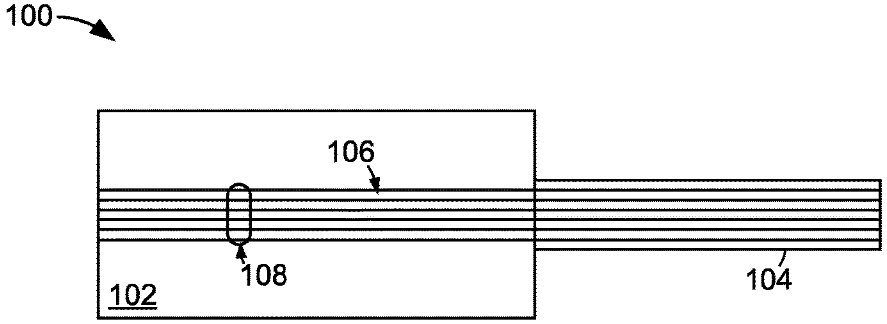
FIG. 1 displays a block representation of an example stringed instrument that may be employed in accordance with various embodiments.

A block representation of an example stringed instrument 100 is conveyed in FIG. 1. The instrument 100 has a body 102 connected to a neck 104 with at least one string 106 suspended above the body 102. It is noted that the body 102 can be any size, shape, and volume to provide a variety of sound characteristics in response to motion of one or more strings 106. A string 106 can physically contact a saddle 108 to transmit string vibrations to the instrument body and control string action and intonation. It is noted that the stringed instrument 100 of FIG. 1 may be any musical instrument, such as a violin, viola, cello, fiddle, guitar, ukulele, and banjo.

Figure 2A:
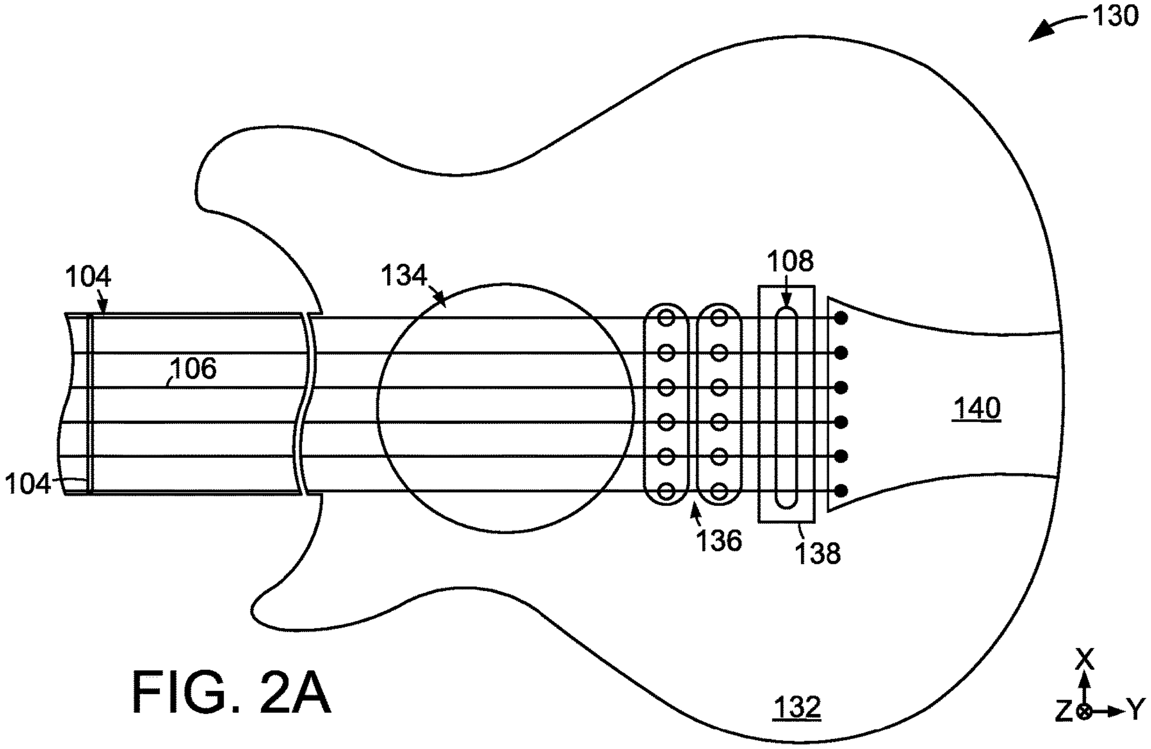
FIGS. 2A and 2B respectively show portions of an example guitar stringed instrument in which some embodiment may be employed.
Figure 2B:
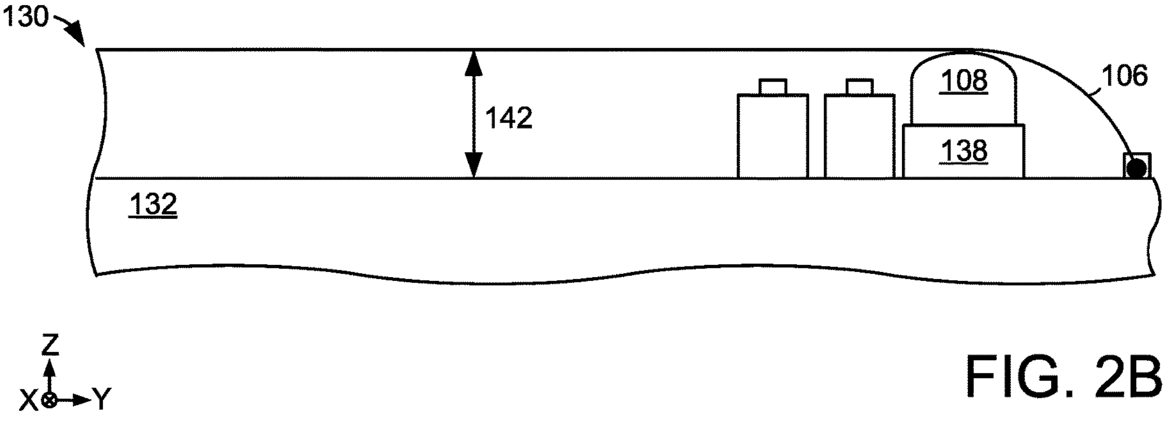

FIGS. 2A and 2B respectively depict line representations of portions of an example guitar stringed instrument 130 arranged in accordance with assorted embodiments. The guitar 130 has six strings 106 that can individually, and collectively, be selected by a user via hand, or bow, to induce string vibration that results in the generation of sound and music. While the strings 106 can acoustically resonate with the volume of air in the guitar body 132 via a sound port 134, various embodiments position an electrical pickup 136 proximal the strings 106 to generate electrical signals to represent the sound properties of the vibrating string(s) 106.

In some embodiments, each string 106 can have dynamic tension provided by tuning pegs of the neck 104, or head portion of the neck 104. String 106 tension may further be facilitated by physical string adjustment in a bridge 138, tailpiece 140, and/or saddle 108. It is noted that no string adjustment configuration is required, or limiting, but a string 106 can have multiple separate components contacting the string 106 with capabilities to adjust the position, tension, and/or height of the string 106 relative to the guitar body 132. It is noted that while the saddle 108 is shown as part of the bridge 138, such configuration is not required and the saddle 108 can be physically separated from the bridge 138 atop the guitar body 132.

The cross-sectional view of FIG. 2B conveys how the respective strings 106 can be anchored to the guitar body 132, via a tailpiece 140 or attachment directly to the bridge 138, and extend over a saddle 108 that positions each string 106 a predetermined height 142 above the body 132. The configuration of the saddle 108 can contribute to how the strings 106 behave once selected by a user and how string vibration translates to generated sound. The height 142 of the strings 106 can be important for tone quality and the function of an electronic pickup 136 that rely on magnetic waves to detect string vibration. Hence, the ability to control string height 142 can allow a guitar 130 to be tuned to the specific string 106 and sound preferences of a user.

Figure 3:
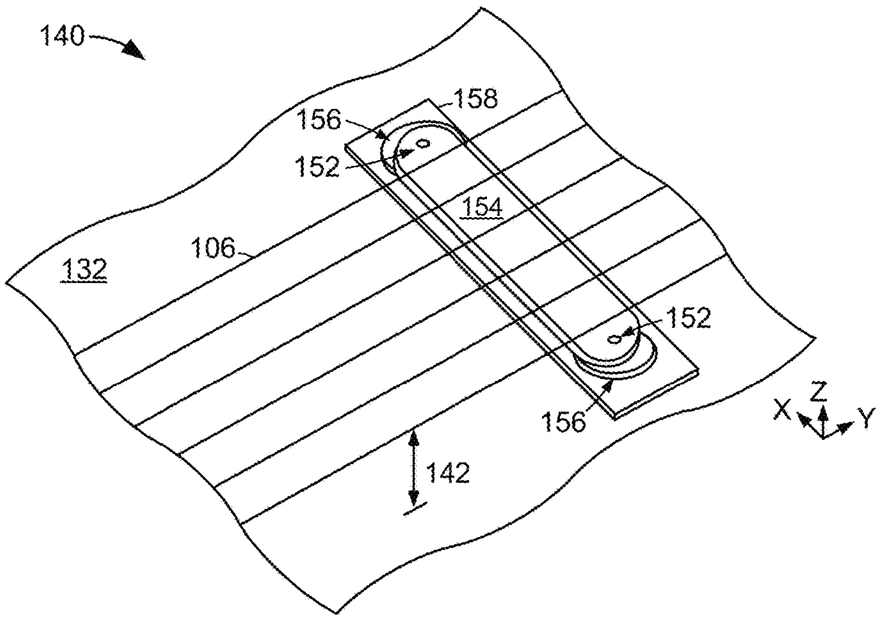
FIG. 3 depicts aspects of an example guitar stringed instrument arranged in accordance with assorted embodiments.

FIG. 3 depicts a line representation of aspects of an example bridge 150 that is vertically adjustable in accordance with some embodiments. The bridge 150 consists of separate poles 152 that allow vertical articulation of a saddle bar 154 relative to the guitar body 132 via dials 156. Rotation of a dial 156 vertically displaces the saddle bar 154 along the Z axis while the bridge base 158 remains stationary and attached to the guitar body 132. Although functional for moving the saddle bar 154, the configuration of the dials 156 can be bulky and inefficient as physical access to the dials under the strings 106 is limited and pressure asserted by the strings 106 downward towards the guitar body 132 makes dial 156 turning difficult.

The size and position of the respective dials 156 can further limit the position of a pickup 136 on the guitar body 132. That is, a pickup 136 cannot be positioned too close to the bridge base 158 to inhibit dial 156 rotation, which limits the tone capability of an electric guitar. As a result of the dial-type bridge 150 shown in FIG. 3, saddle bar 154 adjustment often corresponds with strings being loosened and/or bridge base 158 dislocation to achieve a desired string height 142. It can be appreciated that the inefficiencies and bulky configuration of the bridge 150 provide sub-optimal string 106 adjustment, control, and sound generation.

Figure 4A:
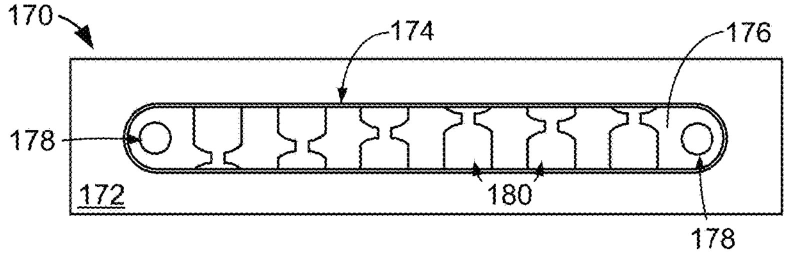
FIGS. 4A-4C respectively depict portions of an example bridge that can be employed in a stringed instrument in accordance with various embodiments.
Figure 4B:
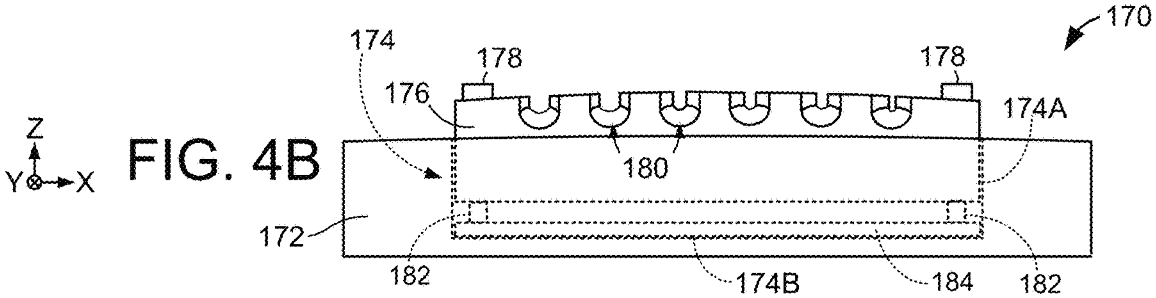
Figure 4C:
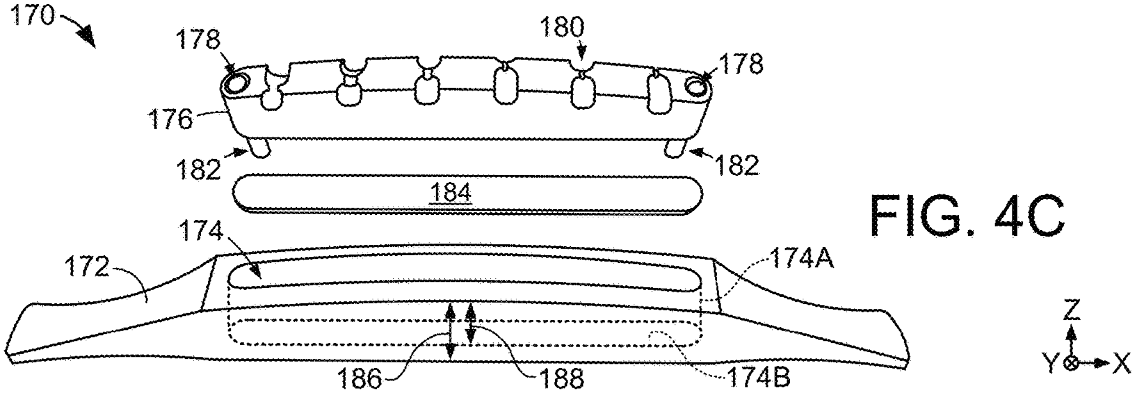

FIGS. 4A-4C respectively depict line representations of an example bridge 170 configured in accordance with various embodiments. The top view of FIG. 4A illustrates how a bridge base 172 has a groove 174 in which a saddle 176 resides. The saddle 176 can be one or more pieces of material that provide a rigid foundation for the saddle 176 to contact the respective strings of an instrument, such as a hollow-body guitar, solid-body guitar, banjo, or violin. The saddle 176, as shown, has a pair of adjustment mechanisms 178 that are laterally disposed, and separated from, string regions 180 that are respectively configured to provide tuned intonation. It is noted that the string regions 180 may be milled notches that can be uniform, or different, for the respective strings to provide desired intonation in response to string articulation and vibration.

The adjustment mechanisms 178 may be any assembly that allows vertical movement of the saddle 176 with respect to the bridge base 172, along the Z axis, while securing the saddle 176 in response to string articulation and vibration. In other words, any mechanism, and any number of mechanisms, can be used in the saddle 176 that provides an acoustically secure contact for the various strings while allowing for tuning of the saddle height upon articulation of the adjustment mechanisms 178. In some embodiments, each adjustment mechanism 178 is a threaded screw that can be turned by hand, or tool, to manipulate the position of the saddle 176 above the bridge base 172.

It is noted that the position of the respective adjustment mechanisms 178 is separated from the string regions 180 along the X axis. Such positioning allows for easy and efficient access to the mechanisms 178 when strings contact the string regions 180 without having to loosen the strings, move the bridge base 172, or move any adjacent electrical pickups. The positioning of the adjustment mechanisms 178 further allow the bridge 170 to have a lower profile than dial-type saddle adjusting assemblies, as shown in FIG. 3.

Through the configuration of the string regions 180 and adjustment mechanisms 178 of the saddle 176, string height above an instrument body can quickly be adjusted while the strings remain at playable tension and intonation thanks to the customized aspects of the string regions 180. That is, the relatively low profile of the saddle 176 along with the rounded, notched, pointed, and/or grooved string regions 180 corresponds with efficient access to the adjustment mechanisms 178, such as with a user's hand or tool, as well as efficient vertical movement of the saddle 176 without having to move the bridge base 172 or any pickups of the musical instrument. The relatively low profile of the bridge 170 further allows it to be utilized in solid body guitars and other instruments that have a low string height, which may be associated with a relatively low pitch neck angle.

The exploded view of the bridge 170 in FIG. 4C illustrates how the adjustment mechanisms 178 can each have a moveable post 182 that, optionally, physically contacts a tone plate 184 that may be positioned between the saddle 176 and the bottom surface of the groove 174 in the bridge base 172. It is noted that the tone plate 184 may rest in a groove formed in a different portion of an instrument, such as the instrument body, pickup, or tailpiece, without contacting a bridge base.

Where a tone plate 184 is positioned between the saddle 176 and the bottom surface of the groove 174, the adjustment mechanism posts 182 do not contact the bridge base 172, or instrument body, directly and, instead, engage the tone plate 184, which has a size, shape, and material that optimizes instrument tone by absorbing pressure from the saddle 176 and distributing string vibration to the instrument body more thoroughly. It should be appreciated that the saddle 176 of various embodiments can be provided with a base having a groove, without a bridge base, or placed in a groove of the instrument body. It is noted that the tone plate 184 is optional, but may be useful where a bridge base, or instrument body, consists of a groove composed of wood, or other material, that a screw adjustment mechanism would potentially pierced through use over time.

The expansion of the components of the bridge assembly 170 in FIG. 4C further illustrates the groove 174 as being formed from an annular sidewall 174A and recessed surface 174B within the bridge base 172. In this way, the bridge base 172 has a thickness 186 that is greater than a depth 188 of the internal groove 174, as shown by arrowed lines. The groove depth 188 and base thickness 186 can respectively be configured to be any size and shape, but in some embodiments the remaining thickness of the base material under the groove 174 is arranged to be as small as possible without the groove 174 extending completely through the base 172. That is, the groove 174 may be configured to be contained within the base 172, which allows the tone plate 184 to distribute tone, vibrations, and other acoustic characteristics of a moving sting 106 throughout the base 172 and to the body of the stringed instrument.

Figure 5:
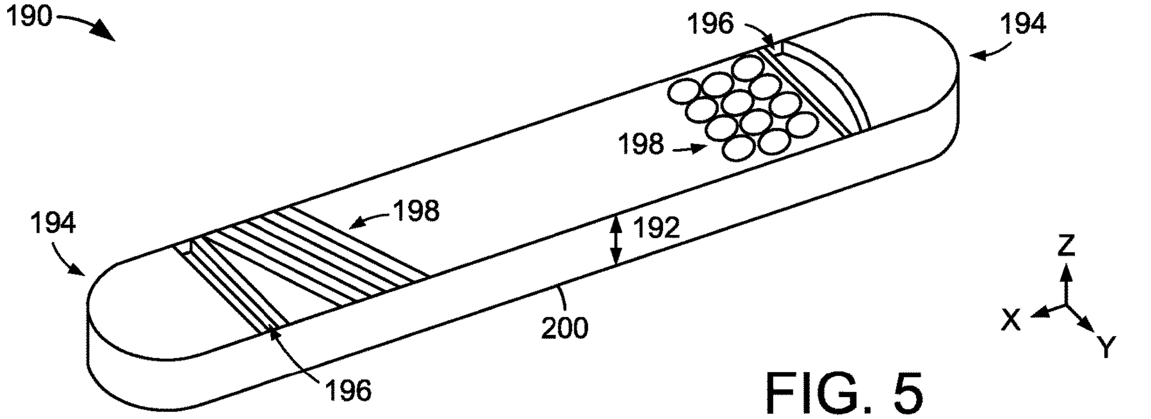
FIG. 5 conveys a top view line representation of portions of an example bridge arranged in accordance with some embodiments.

FIG. 5 depicts a line representation of an example tone plate 190 that can be utilized as part of a bridge in accordance with various embodiments. The tone plate 190 may be constructed of any number, and type, of material that efficiently distribute acoustic properties, such as metals, ceramics, stone, and wood. The tone plate 190 can have a uniform, or varying, thickness 192 that accommodates physical contact with one or more adjustment components extending from a saddle as part of a bridge, as shown in FIG. 4C. For instance, the tone plate 190 may have flat, tapered, or rounded regions 194 proximal the lateral ends of the plate 190 to contact a screw that sets the height of the saddle relative to the tone plate 190.

It is contemplated that the tone plate 190 has one or more relief regions 196, such as, but not limited to, indentions, recesses, holes, grooves, or surface textures to tune how the acoustic properties of a moving string are translated by the tone plate 190 to a bridge base. Some embodiments configure the tone plate 190 with two different surface configurations, as generally displayed by the comparative textures of regions 198. The top 200 and bottom 202 surfaces of the tone plate 190 may also be constructed with different surface shapes, textures, and configuration that exhibit different acoustic energy transfer characteristics that allow a user to customize the tone and acoustic properties of the instrument simply by flipping the tone plate 190 over inside the bridge base groove 174.

Figure 6:
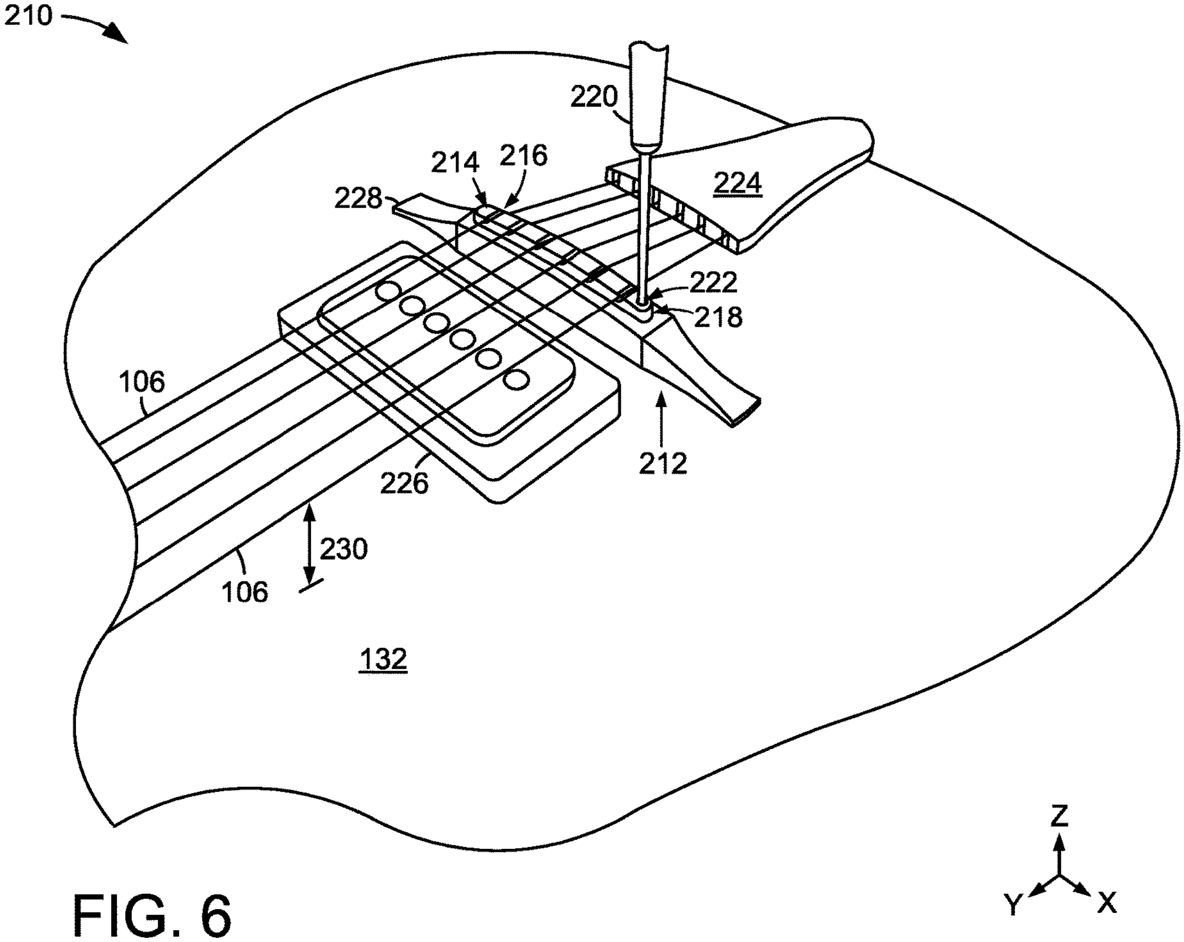
FIG. 6 depicts aspects of a guitar stringed instrument constructed and operated with a bridge in accordance with assorted embodiments.

FIG. 6 depicts a perspective line representation of an example stringed instrument 210 that utilizes a bridge 212 in accordance with assorted embodiments. As shown, the bridge 212 is attached to the instrument body 132, which can be facilitated with fasteners and/or adhesives, to present the saddle 214 in a manner to contact and control the respective strings 106. The saddle 214 is configured with string recesses 216 that contain each string 106 in a predetermined location on the saddle 214 and provides a set intonation and translation of acoustic energy to the instrument body 132 via a tone plate positioned between the saddle 214 and bridge 212 within the bridge groove 218.

While not part of the stringed instrument 210, an example tool 220 is shown in FIG. 6 to illustrate how an adjustment mechanism 222 of the saddle can be articulated to move the saddle 214 up, or down, along the Z axis without moving the bridge 212, tailpiece 224, and/or pickup 226 without loosening the tension on the respective strings 106. It is contemplated that the adjustment mechanism 222 is articulable by hand, such as with a knob or recessed dial that does not inhibit a user's access to the respective strings 106, but such arrangement can be bulky, complicated, and unstable when the instrument 210 is being played.

With the saddle 214 being recessed into the bridge base 228 and configured with recesses 216 that can be uniquely tuned to provide different intonations, string vibrations, string action, and string control for the respective strings 106, the bridge 212 can present the strings 106 with a relatively low height 230 above the instrument body 132 along with the pickup 226. The low string height can be adjusted by a user at any time without altering the playability of the instrument 210 thanks to the adjustment mechanisms 222. It is contemplated that multiple, separate adjustment mechanisms 222 are provided by the saddle 214 and can be individually, or collectively, articulated to provide fine resolution tuning of the string height 230, such as between strings 106 on the extreme lateral sides of the saddle 214.

As discussed above, the saddle 214 can have a base itself with a groove, may be provided without a bridge base, and may be placed in a groove of an instrument body. It is reiterated that the tone plate is optional, but may be useful when a bridge base, or instrument body, has a groove constructed of a material that can be pierced over time through engagement with a saddle adjustment mechanism.

Figure 7:
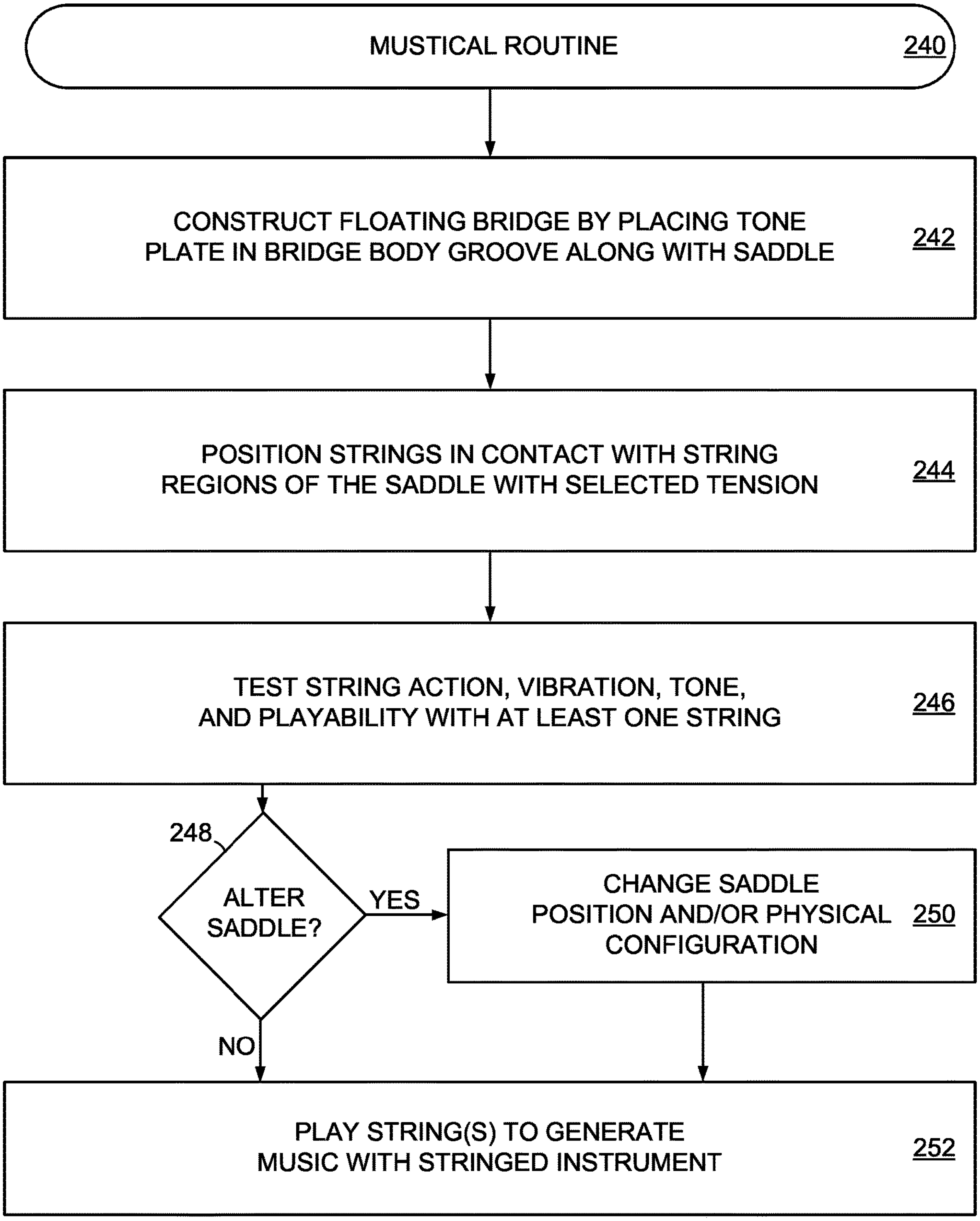
FIG. 7 is an example bridge utilization routine that can executed as part of a stringed instrument to optimize the generation of musical sound.

FIG. 7 is a flowchart of an example musical routine 240 that can be practiced with a stringed instrument in accordance with various embodiments. Initially, a bridge is constructed in step 242 by placing a tone plate at the bottom of a bridge body groove and positioning a saddle atop the tone plate in the groove. It is noted that a bridge base of the bridge is attached to the instrument body and the saddle may have an asymmetrical configuration where string regions are intended for particular string thicknesses.

In some embodiments, construction of the floating bridge allows step 244 to position strings in contact with the saddle, which corresponds with tensioning the respective strings with one or more tensioners arranged throughout the instrument. At least one string is played in step 246 to test the action and height of the string as well as the tone of the instrument. Such playing may be facilitated by hand and/or with a tool, such as a pick or bow. Decision 248 then determines if a saddle adjustment is in order based on the results of step 246. If so, step 250 proceeds to change one or more characteristics of the saddle, which may involve manipulating one or more adjustment mechanisms, flipping a tone plate, or reversing the orientation of the saddle in the groove. As a result of such adjustment in step 250, a user can customize multiple different aspects of the feel and acoustic characteristics of the strings, and instrument as a whole.

The tuned configuration of the instrument, or in the event no saddle adjustment was necessary from decision 248, advances routine 240 to step 252 where the string(s) are played to generate music that has the tuned tone and intonation afforded by the bridge. The ability to revisit step 250 any number of times to provide different instrument tuning without having to temporarily eliminate the playability of the instrument allows for efficient optimization of the strings, tone, and instrument as a whole.

Figure 8A:
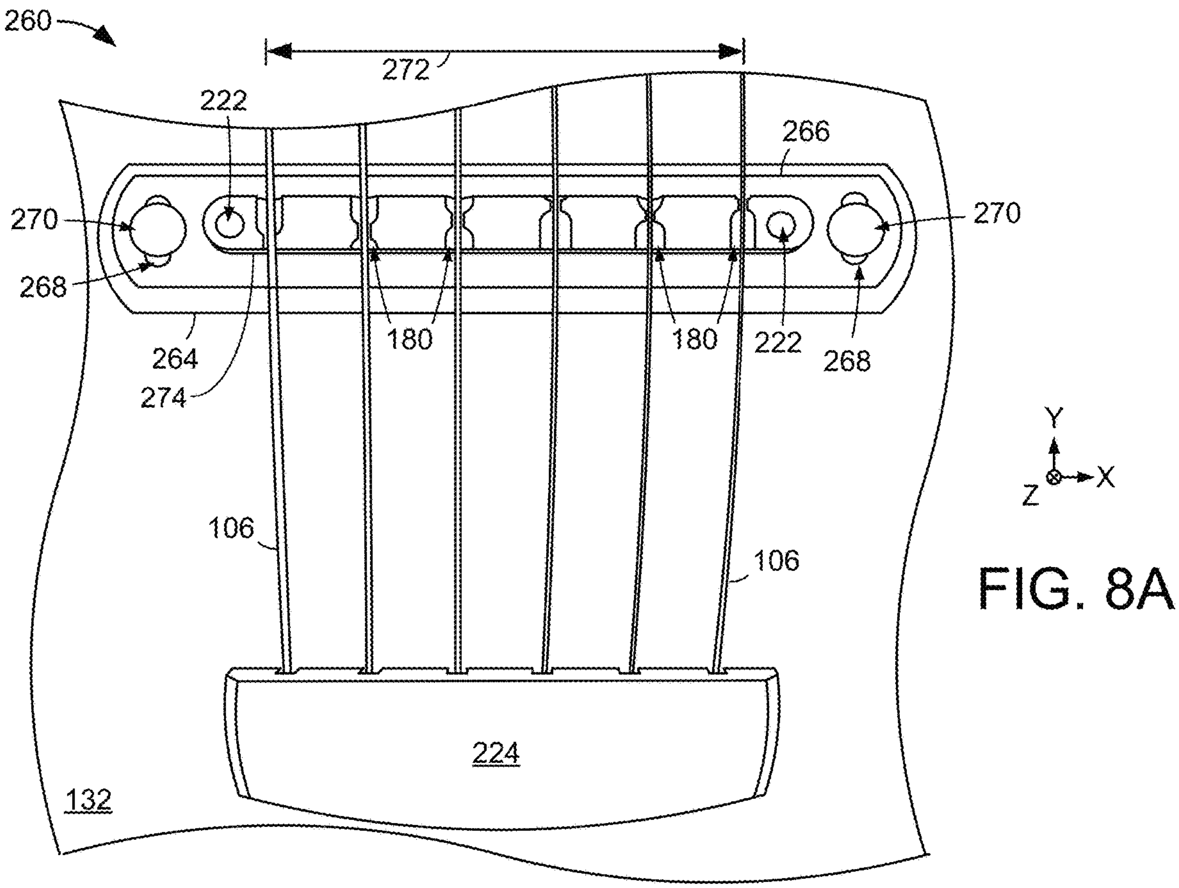
FIGS. 8A-8D respectively illustrate portions of an example stringed instrument arranged and operated in accordance with various embodiments.

FIGS. 8A-8D respectively depict portions of an example stringed instrument 260 employing various aspects of a bridge configured to provide efficient tuning, hardware manipulation, and acoustic tuning. FIG. 8A conveys a line representation of an example bridge assembly 262 that is aligned underneath tensioned instrument strings 106 that continuously extend from a tailpiece 224 to a neck of the instrument, such as neck 104 of FIG. 1. While not required or limiting, the bridge assembly 262 has a base plate 264 attached to the instrument body 132 and supporting an orientation plate 266 and a saddle 214.

The orientation plate 266 is configured with slots 268 that are each partially filled with a fastener 270 that can be tightened to secure the orientation plate 266 in the X-Y plane. For instance, the respective slots 268 can be sized to allow the orientation plate 266 to rotate in the X-Y plane relative to the strings 106. As a result, the physical engagement of the respective string regions 180 with the respective strings 106 can be tuned and controlled to manipulate the acoustic properties of the strings 106 when struck by a user. The combination of the ability to manipulate height of the saddle 214 relative to the instrument body 132 along with the orientation of the string regions 180 allows for precise control of acoustic string properties as well as a dynamic range of tuning options.

It is noted that the bridge assembly 262 positions the saddle 214 so that each articulation mechanism 222 is positioned outside of an areal extent 272 of the collection of strings. As shown, the saddle 214 continuously extends along a longitudinal axis (X Axis) to present each articulation mechanism 222 wholly external to the strings 106 and accessible without moving, loosening, or removing any string 106.

Figure 8B:
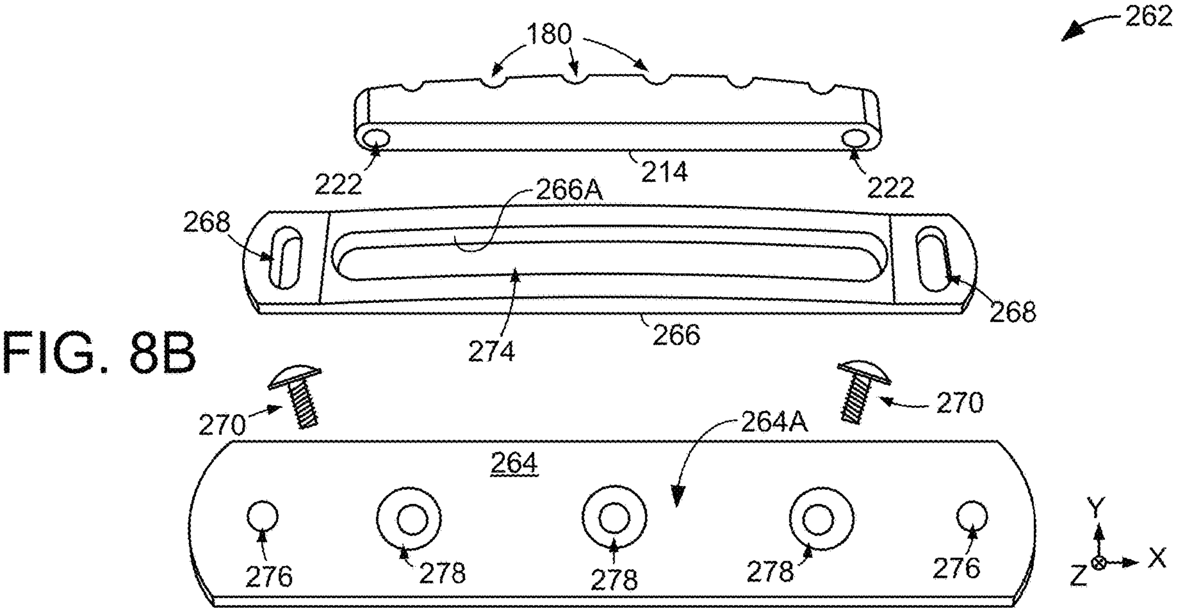

FIG. 8B depicts an exploded view of an example bridge assembly 262 that can be utilized in a diverse range of stringed instruments, such as guitars, bass, mandolin, banjo, and violins. The assembly 262 employs a base plate 264 with a uniform, or varying, thickness, as measured along the Z axis, that is constructed of one or more rigid materials, such as metal, ceramic, stone, and wood. The base plate 264 supports the orientation plate 266 and allows a groove aperture 274 to be customized for position in the X-Y plane, which orients the saddle 214 and constituent string regions relative to the longitudinal axis of the strings 106 (X axis). The groove aperture 274 is formed by interior sidewall 266A in the orientation plate 266 and a top surface portion 264A of the underlying base plate 264, and can be any size, shape, and thickness to secure the saddle 214 in position while one or more strings 106 are played by a user. It is noted that recessing the saddle into the orientation plate groove 274 allows the saddle 214 to continually contact the base plate 264 during use, which provides a rigid, secure foundation to ensure consistent acoustic performance from strings 106 residing in the string regions 180 of the saddle 214.

Figure 8C:
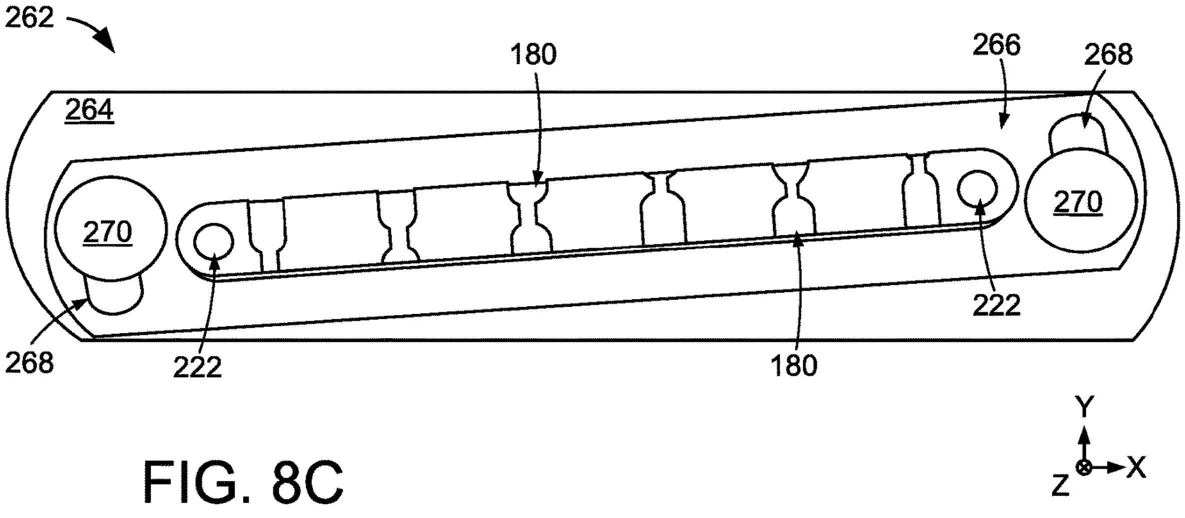

Although not limiting, the example assembly 262 embodiment of FIG. 8C illustrates how the orientation plate 266 can be secured in a non-normal, angular configuration with respect to the X axis, which is parallel to the longitudinal axis of the base plate 264. Through selective loosening and tightening of one or more fasteners 270, the orientation plate 266 can be configured in a range of angular configurations that customize how the respective string regions 180 physical engage the respective strings 106 and acoustically perform when struck by a user. The respective fasteners 270 extend through the orientation plate slots 268 and into a threaded holes 276 in the base plate 264 while additional, non-threaded and potentially countersunk, holes 278 can be used to securely attach the base plate 264 to an instrument body 132. It is contemplated that the base plate 264 is attached, via one or more holes 278 with fasteners, such as screws or rivets, with adhesive, such as epoxy or glue, or with a combination of mechanical and chemical connections.

Figure 8D:
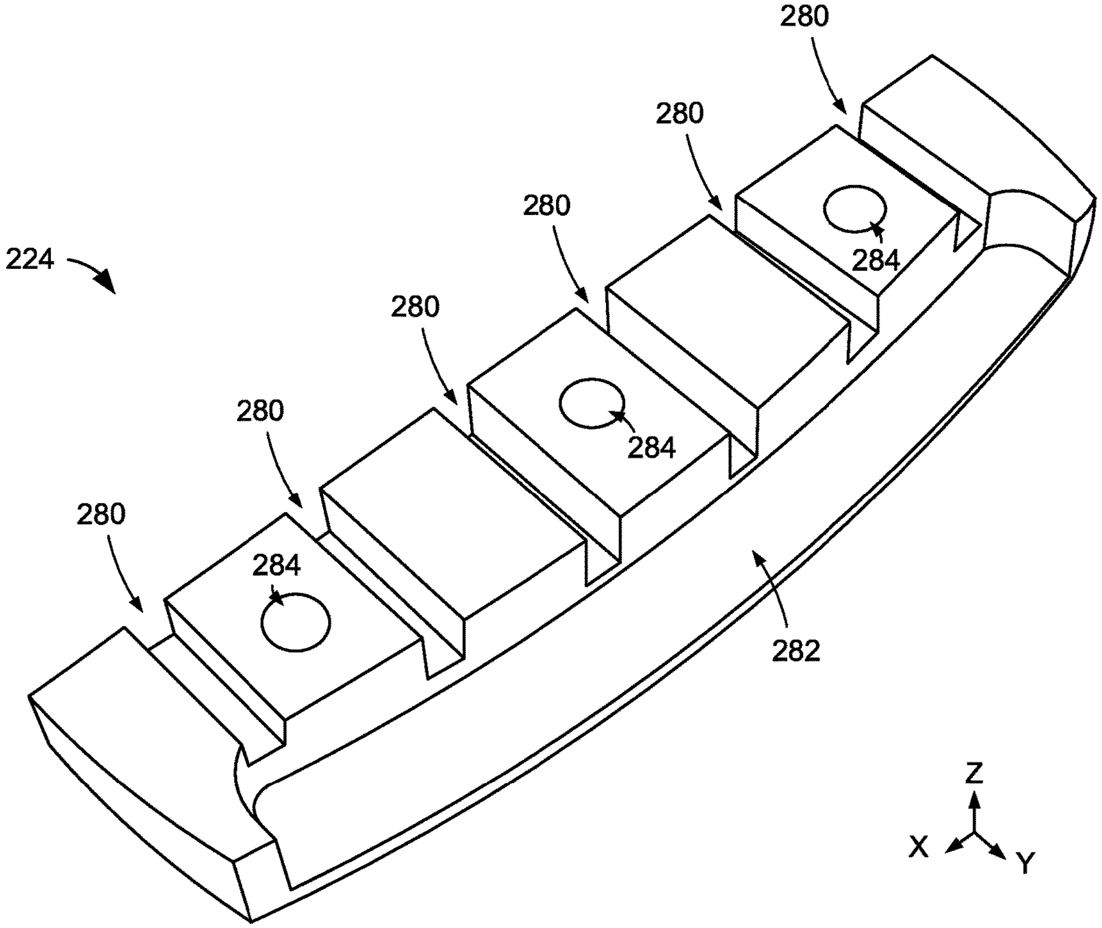

FIG. 8D illustrates a tailpiece 224 portion of a stringed instrument 260 arranged in accordance with some embodiments to have separated string slots 280 to retain the respective strings 106. By tuning the size, depth, and length of the respective string slot 280, customized amounts of surface area can contact the string and retain a string stop in a designated position in a channel 282, as generally shown in FIG. 2B.

The secure retention of the respective strings 106 is complemented by one or more attachment apertures 284 that can be filled with mechanical or chemical fastening materials that reliably connect the tailpiece 224 to a designated location on an instrument body 132. With many stringed instruments relying on relatively high string tension during use, the ability to secure the respective strings 106 to the tailpiece 224 as well as the tailpiece 224 to the instrument body 132 provides optimal instrument consistency, reliability, and performance. It is noted that the tailpiece slots 280, as compared to holes, allows for the strings to be positioned closer to the instrument body than with traditional tailpieces. Advantageously, tailpiece 224 can have a very low profile, similarly to the bridge assembly 262, thus allowing sufficient string down force on the bridge.

The various aspects of the bridge assembly 262 can be contrasted to adjustable bridges that utilize mechanisms positioned inside the areal extent of the instrument strings, as generally shown in FIG. 3. That is, positioning adjustment dials under the saddle, in comparison to the adjustment mechanisms 222 that are located wholly outside the areal extent under the respective strings, can be inhibited by the strings and/or pickup, which make tuning string/saddle height difficult and inefficient. Configuring a bridge with adjustment mechanisms under the saddle may also increase the minimum height of the saddle above the instrument body, which contrasts the recessed saddle and nested adjustment mechanisms of assembly 262 that have a relatively low minimum saddle height above a body. It is noted that such high saddle height can limit the tunability of the saddle and instrument.

The ability to employ a tool to alter the vertical position of the saddle, along the Z axis, as shown in FIG. 6, without being physically inhibited by the strings, tailpiece, or pickup ensures an efficient and simple fine resolution adjustment of instrument tone, string action, string vibration translation, and instrument playability. In some aspects, a bridge assembly 262 can be used on a solid body electric guitar (or other suitable guitars), and can comprise a low-profile, fully adjustable bridge where no neck angle/pitch is required.

In some embodiments, string regions 180 may be calibrated and need no adjustments over time. For example, if one or more strings are replaced with strings having a different gauge such that intonation need to be slightly corrected or adjusted, it can be done without removal of strings by using only two adjustments screws and moving the "slide" positioning the saddle. It is contemplated that the saddle may be adjusted along a Z axis by about ¼ inch in some embodiments.

Even though numerous characteristics and advantages of the various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising an instrument body physically supporting a bridge base beneath a plurality of strings, the bridge base having a groove formed by an annular sidewall and a base recessed surface and in which a tone plate and saddle are each positioned so that the tone plate contactingly engages the base recessed surface, the saddle having an articulation mechanism extending through the saddle and positioned wholly outside of an areal extent of the plurality of strings, the articulation mechanism contacting the tone plate to support the saddle during movement of at least one of the plurality of strings.

2. The apparatus of claim 1, wherein each of the plurality of strings contacts a separate string region recessed into the saddle, and wherein each string region has a differently configured opening sized to capture one of the plurality of strings.

3. The apparatus of claim 1, wherein the tone plate comprises at least one relief region configured to tune an acoustic operation of the plurality of strings.

4. The apparatus of claim 1, wherein the bridge base is formed of a unitary piece of material into which the groove extends so that the bridge base has an overall elevational height distance greater than an overall depth of the groove and the interior sidewall contactingly supports a side of the saddle.

5. The apparatus of claim 1, wherein the bridge base is formed of a base plate which supports an orientation plate, the annular sidewall of the groove comprising an elongated through-hole aperture that extends wholly through the orientation plate, the base recessed surface of the groove comprising a selected portion of a top surface of the base plate, and wherein the orientation plate further comprises a pair of elongated slots at opposing ends thereof to accommodate a second attachment mechanism to clamp the orientation plate at a desired angle to the base plate.

6. The apparatus of claim 1, wherein the articulation mechanism comprises a threaded member recessed into the saddle, the threaded member having a distal end which contactingly engages a top surface of the tone plate within the groove.

7. The apparatus of claim 1, wherein the bridge base is attached to the instrument body via at least one fastener positioned under the tone plate.

8. The apparatus of claim 1, wherein the saddle extends from within the groove in the bridge base to contact each string.

9. The apparatus of claim 1, wherein the areal extent of the plurality strings is measured as an overall width of the plurality of strings along an axis perpendicular to a longitudinal axis of each string and parallel to a longitudinal axis of the saddle.

10. A bridge assembly for an instrument body comprising:

a bridge base attached to the instrument body beneath a plurality of strings, the bridge base having a groove aligned with the plurality of strings;

a saddle positioned within the groove of the base bridge, the saddle contacting each of the plurality of strings and having a first articulation mechanism and a second articulation mechanism, each of the first and second articulation mechanisms positioned wholly external to an areal extent of the plurality of strings; and a tone plate positioned between the saddle and the instrument body within the groove in the bridge base, the tone plate comprising a rigid material and contacting each articulation mechanism, the tone plate further comprising at least one relief region configured to tune an acoustic operation of the plurality of strings.

11. The bridge assembly of claim 10, wherein the groove comprises an annular sidewall and a base recessed surface, and wherein the tone plate contactingly engages the base recessed surface.

12. The bridge assembly of claim 10, wherein the tone plate has a varying thickness.

13. The bridge assembly of claim 10, wherein the tone plate concurrently contacts the saddle and each articulation mechanism.

14. The bridge assembly of claim 10, wherein the bridge base is formed of a base plate which supports an orientation plate, wherein the groove comprises an annular sidewall of an elongated through-hole aperture that extends wholly through the orientation plate and a selected portion of a top surface of the base plate, and wherein the bridge assembly further comprises an attachment mechanism configured to clamp the orientation plate at any one of a number of desired angles to the base plate to establish a desired angular configuration of the orientation plate to the base plate.

15. A method comprising:

positioning a tone plate within a groove of a bridge base, the bridge base attached to an instrument body, the groove formed from an annular sidewall and a recessed surface, the recessed surface contactingly supporting the tone plate;

contacting each of a plurality of strings with a saddle positioned in the groove of the bridge base atop the tone plate;

tensioning the plurality of strings to produce a predetermined sound upon selection of at least one of the plurality of strings; and adjusting a height of the saddle relative to the tone plate with at least one articulation mechanism of the saddle, each articulation mechanism positioned wholly outside an areal extent of the plurality of strings to allow the height adjustment without moving the plurality of strings.

16. The method of claim 15, wherein the height of the saddle is adjusted by rotating a screw nested within the saddle, the screw having a distal end that contactingly engages a top facing surface of the tone plate.

17. The method of claim 15, wherein a first side of the saddle has a different height than a second side of the saddle, the first side located laterally adjacent the plurality of strings along a longitudinal axis of the saddle, the second side located on a laterally adjacent opposite end of the saddle.

18. The method of claim 15, wherein the at least one articulation mechanism is engaged by a tool to adjust the height of the saddle, and wherein the tool is removed from the saddle in response to the saddle reaching a selected height above the instrument body.

19. The method of claim 15, wherein the bridge base is formed of a base plate which supports an orientation plate, wherein the annular sidewall of the groove is an elongated through-hole aperture that extends wholly through the orientation plate and the recessed surface of the groove is a selected portion of a top surface of the base plate, and wherein the method further comprises:

rotating the orientation plate relative to the base plate to place the orientation plate in a desired angular configuration with respect to the base plate; and activating an attachment mechanism to clamp the orientation plate to the base plate at the desired angular orientation.

20. The method of claim 19, wherein the tone plate comprises at least one relief region configured to tune an acoustic operation of the plurality of strings.

* * * * *